(12) United States Patent
Kouropoulos

(10) Patent No.: US 6,961,856 B1
(45) Date of Patent: Nov. 1, 2005

(54) PERSONAL COMPUTER PROTECTION DEVICE

(76) Inventor: Peter Kouropoulos, 461 W. Estudillo, San Leandro, CA (US) 94577

( * ) Notice: Subject to any disclaimer, the term of this patent is extended or adjusted under 35 U.S.C. 154(b) by 709 days.

(21) Appl. No.: 09/612,612

(22) Filed: Jul. 9, 2000

(51) Int. Cl.$^7$ .......................... G06F 13/00; H01H 1/00; H01H 9/00
(52) U.S. Cl. ...................... 713/200; 713/324; 713/300; 713/330; 713/340; 361/116; 361/117; 361/118; 361/119; 361/166; 307/38; 307/125
(58) Field of Search ............................ 713/200, 300, 713/340, 324, 330; 710/73, 125; 345/156; 395/750; 307/38, 125; 361/116–119, 166; 439/502

(56) References Cited

U.S. PATENT DOCUMENTS

| | | | | |
|---|---|---|---|---|
| 4,647,721 A | * | 3/1987 | Busam et al. ........... | 379/102.04 |
| 5,113,294 A | * | 5/1992 | Kim ........................... | 386/83 |
| 5,329,178 A | * | 7/1994 | Burton ....................... | 326/39 |
| 5,359,540 A | * | 10/1994 | Ortiz ......................... | 700/295 |
| 5,424,903 A | * | 6/1995 | Schreiber ................... | 361/166 |
| 5,721,934 A | * | 2/1998 | Scheurich ................... | 713/320 |
| 5,904,591 A | * | 5/1999 | Shiau ......................... | 439/502 |
| 5,978,923 A | * | 11/1999 | Kou ........................... | 713/323 |
| 6,151,649 A | * | 11/2000 | Liong et al. ................ | 710/314 |
| 6,437,951 B1 | * | 8/2002 | Ahlstrom et al. ............. | 361/42 |
| 6,501,195 B1 | * | 12/2002 | Barton ....................... | 307/125 |
| 6,622,250 B1 | * | 9/2003 | Castillo et al. ............. | 713/300 |
| 6,657,534 B1 | * | 12/2003 | Beer et al. .................. | 340/3.1 |

* cited by examiner

Primary Examiner—Ayaz Sheikh
Assistant Examiner—Carl G Colin
(74) Attorney, Agent, or Firm—Henneman & Saunders; Larry E. Henneman, Jr.

(57) ABSTRACT

A personal computer protection device for disconnecting a computer system from a communications channel during power down periods. The personal computer protection device includes a power sensor for sensing power drawn by the computer system, an input port for connecting to a communications channel, an output for connecting the input port to a communications channel input of the computer system and a relay connected between the input port and output port. The relay selectively disconnects the input port and output port when the sensor senses the power drawn is below a threshold value thereby indicating the computer system is in a powered down or sleep state.

16 Claims, 6 Drawing Sheets

PERSONAL COMPUTER PROTECTION DEVICE

BACKGROUND OF THE INVENTION

1. Field of the Invention

The present invention relates generally to computers and, more specifically, to a device able to block access to communications lines connected to a personal computer at times of inactivity thus preventing others from accessing the computer without authorization.

2. Description of the Prior Art

Numerous types of protection devices for computers have been provided in the prior art. Most of these devices are software related and act to prevent others from accessing your computer through connection with an outside line such as a cable line, DSL line, modem line or phone/fax line. Protecting information contained on computers from unrestricted access through connections to outside communications channels is a high priority for most users as the amount of business performed on computers is increasing at an enormous rate.

In today's high speed, internet environment consumers are able to perform most any task over the internet such as investing, banking, shopping, etc. and most people store personal private information on their computers. Hacker's are constantly devising new methods for accessing information on anyone's computer without the alerting the affected party to the intrusion. Software and firewalls available today are able to protect personal computers to a certain extent when the computer is turned on. However, when the computer is off, the software is ineffective on intruders. Personal firewalls are also helpful in preventing intrusions however they are very expensive. While these units may be suitable for the particular purpose to which they address, they would not be as suitable for the purposes of the present invention as heretofore described.

Cable, DSL and regular modem/phone lines are always powered on. This presents a problem for PC owners connected to the internet through these communications channels. Thus, even with the most advanced software and firewall protection, an experienced hacker can still break through the security of any known protection on the market today.

It is thus desirable to provide a personal computer protection device which is able to disconnect a personal computer from cable, DSL and regular modem/phone lines when the computer has been inactive for a period of time or has been turned off. It is further desirable to provide a personal computer protection device which is able to sense the power provided to a monitor and disconnect the computer from the cable, DSL and/or regular modem/phone lines when the monitor in a sleep mode or turned off. It is even further desirable to provide a personal computer protection device which is able to connect between a personal computer and any one or combination of cable, DSL and regular modem/phone lines and disconnect the personal computer therefrom upon sensing a predetermined condition.

SUMMARY OF THE PRESENT INVENTION

The present invention relates generally to computers and, more specifically, to a device able to block access to communications lines connected to a personal computer at times of inactivity thus preventing others from accessing the computer without authorization.

A primary object of the present invention is to provide a personal computer protection device that will overcome the shortcomings of prior art devices.

Another object of the present invention is to provide a personal computer protection device which is able to disconnect a personal computer from cable, DSL and regular modem/phone lines when the computer has been turned off.

A further object of the present invention is to provide a personal computer protection device which is able to sense the power drawn by a monitor to determine if the monitor has entered a sleep mode or has been turned off.

A yet further object of the present invention is to provide a personal computer protection device wherein the device will disconnect the personal computer from the cable, DSL and regular modem/phone lines upon detecting the monitor has entered a sleep mode or has been turned off.

A still further object of the present invention is to provide a personal computer protection device including input and output ports for cable, DSL and regular modem/phone lines.

An even further object of the present invention is to provide a personal computer protection device having an additional output port for connection to a telephone or facsimile machine.

A yet further object of the present invention is to provide a personal computer protection device wherein the device will allow access to the computer for a specific preset period during the day thereby allowing the user to connect with the computer during the predetermined interval.

A still further object of the present invention is to provide a personal computer protection device wherein the sensor will trigger a relay or switch upon sensing the monitor is in a sleep mode or has been turned off.

A yet further object of the present invention is to provide a personal computer protection device able to sense the system power of a one piece processor monitor system.

An even further object of the present invention is to provide a personal computer protection device wherein the telephone and facsimile output port is operable even when the ports for the cable, DSL and regular modem/phone lines have been disconnected by the device.

A yet further object of the present invention is to provide a personal computer protection device that is simple and easy to use.

An even further object of the present invention is to provide a personal computer protection device that is economical in cost to manufacture.

Additional objects of the present invention will appear as the description proceeds.

A personal computer protection device for disconnecting a computer system from a communications channel during power down periods is described by the present invention. The personal computer protection device includes a power sensor for sensing power drawn by the computer system, an input port for connecting to a communications channel, an output port for connecting the input port to a communications channel input of the computer system and a relay connected between the input port and output port. The relay selectively disconnects the input port and output port when the sensor senses the power drawn is below a threshold value thereby indicating the computer system is in a powered down or sleep state. The device preferably includes first, second and third input ports, first, second and third corresponding output ports and first second and third relays, each relay being connected between a respective pair of input and output ports. The first input and first output are preferably cable connectors, the second input and second output are preferably xDSL connectors and the third input and third output ports are preferably telephone connectors. The device also includes a telephone/facsimile connector which is powered on at all times. A manual override switch is provided for manually triggering the relay. The sensor also triggers the relay to connect said input and output port during a predetermined period during a day thereby allowing a user to contact the computer system through the communications channel during the predetermined time of day.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWING FIGURES

Various other objects, features and attendant advantages of the present invention will become more fully appreciated as the same becomes better understood when considered in conjunction with the accompanying drawings, in which like reference characters designate the same or similar parts throughout the several views.

DESCRIPTION OF THE REFERENCED NUMERALS

Figure 1:
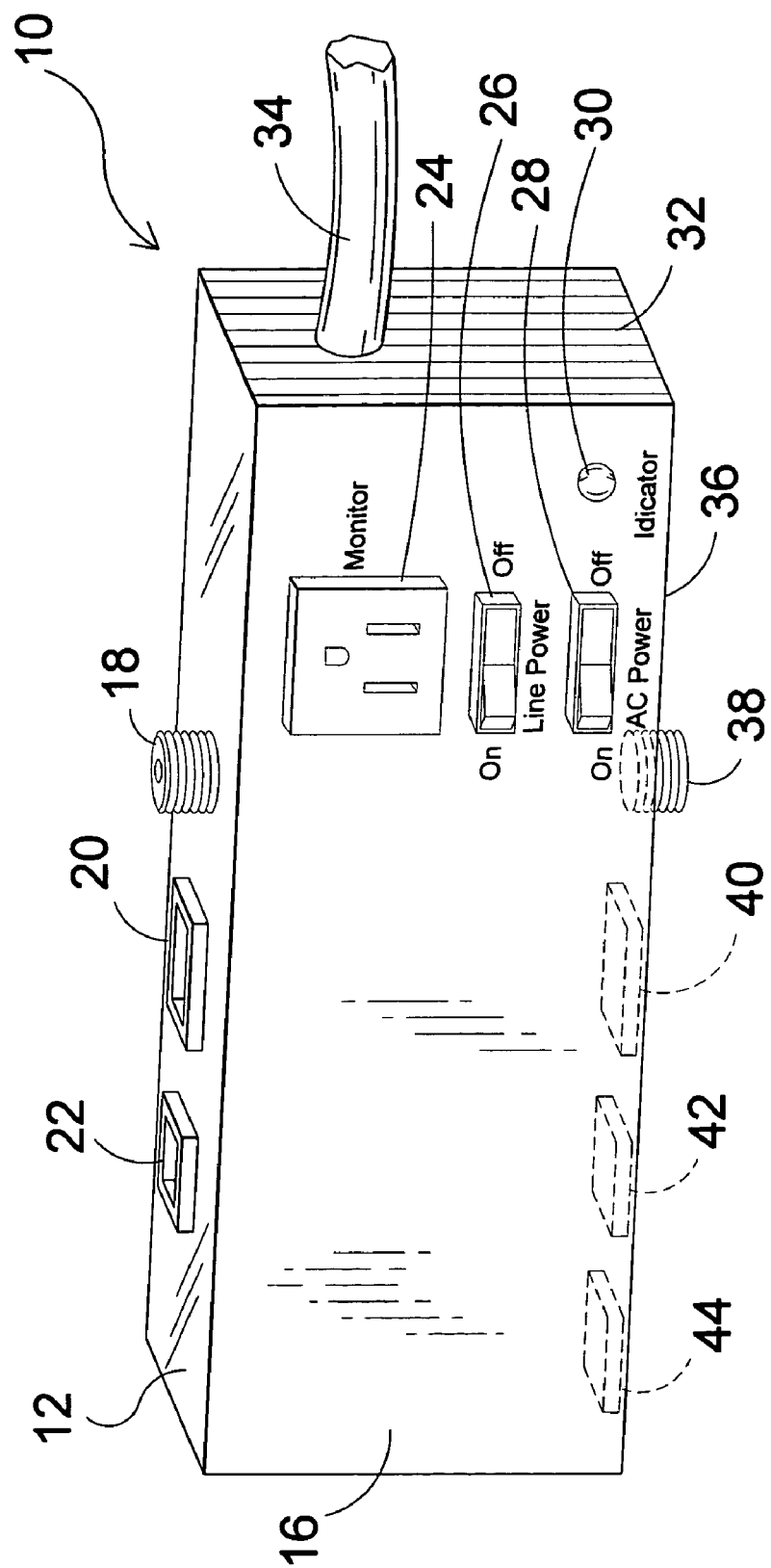
FIG. 1 is a top perspective view of the personal computer protection device of the present invention.

Turning now descriptively to the drawings, in which similar reference characters denote similar elements throughout the several views, the Figures illustrate the personal computer protection device of the present invention. With regard to the reference numerals used, the following numbering is used throughout the various drawing figures.

10 personal computer protection device of the present invention
12 housing
14 top side
16 front side
18 cable connector
20 xDSL connector
22 modem line connector
24 AC input
26 line power override switch
28 AC power switch
30 indicator light
32 another side of the housing
34 power cord
36 second side of the housing
38 cable output connector
40 xDSL output connector
42 modem line connector
44 phone/fax connector
46 AC power supply
48 power sensor
50 first relay
52 second relay
54 third relay
56 computer system
58 microprocessor of computer system
60 memory

DETAILED DESCRIPTION OF THE PREFERRED EMBODIMENT

Turning now descriptively to the drawings, in which similar reference characters denote similar elements throughout the several views, FIGS. 1 through 6 illustrate the personal computer protection device of the present invention indicated generally by the numeral 10.

The personal computer protection device 10 is shown in FIG. 1 and includes a housing 12. From this view, a first side 14 and top side 16 of the housing 12 are clearly visible. The first side 14 includes a cable input connector 18 for connection with a cable line, a xDSL input connector 20 for connection with a high speed DSL line and a modem line connector 22 for connection with a telephone line.

On the top side 16 are an AC input 24 for a computer monitor, a line power override switch 26 and an AC power switch 28. The AC input 24 is provided for connection to a monitor of a computer (not shown) for supplying power to the monitor and sensing the amount of power being drawn by the monitor. The line power switch 26 is provided for manually disconnecting the cable connector 18, xDSL connector 20 and modem line connector 22 from an output thereof. The AC power switch 28 switches the personal computer protection device 10 between the on and off modes. An indicator light 30 provides a visual indication to a user that the personal computer protection device 10 is in the on mode when illuminated.

Extending from another side 32 of the housing 12 is a power cord 34 for connection to an AC power source. Shown in phantom on a second side 36 of the housing are a cable output connector 38 for connection with a cable input port of a computer, a xDSL output connector 40 for connection with a DSL input connector of a computer and a modem line connector 42 for connection with a modem line input of a computer. A telephone/fax connector 44 is also provided on the second side 36.

Figure 2:
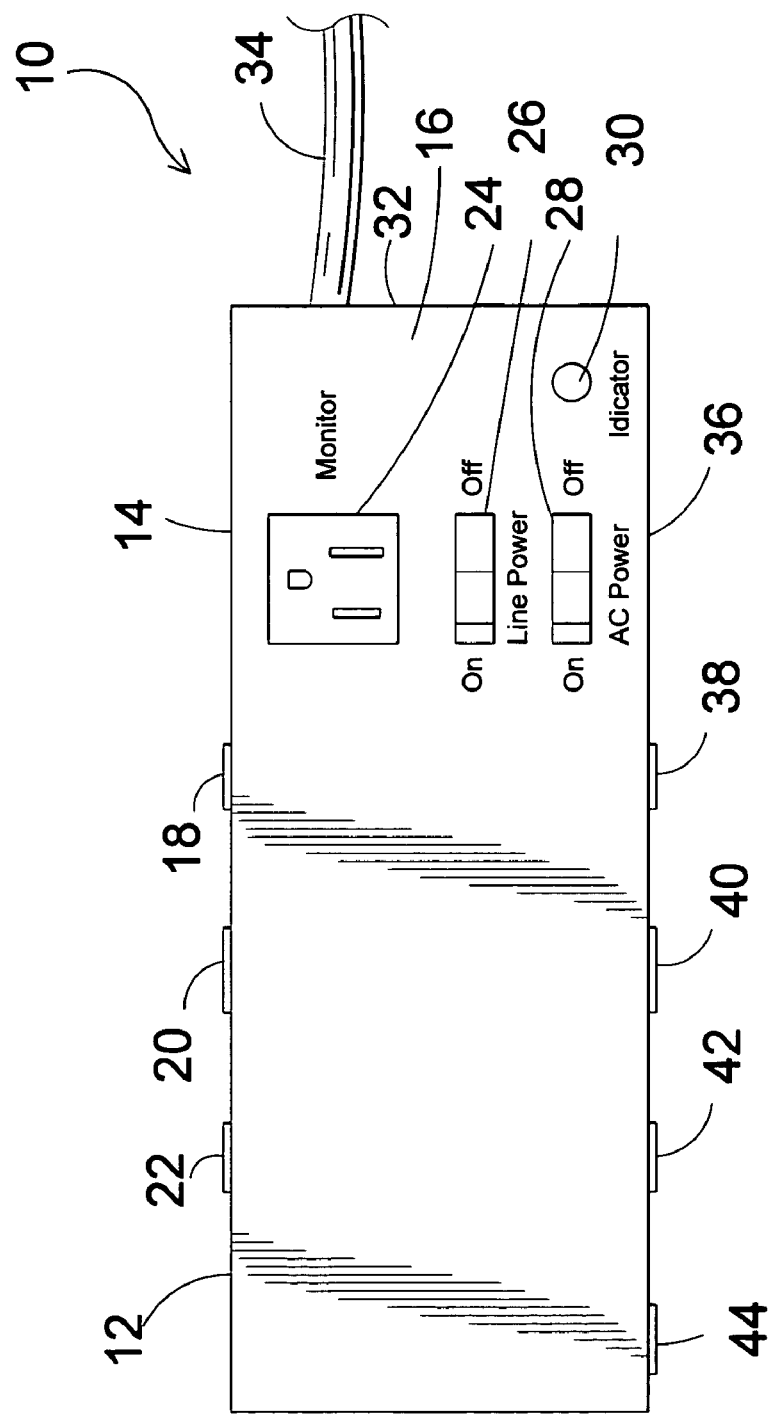
FIG. 2 is a front view of the personal computer protection device of the present invention.

A top view of the personal computer protection device 10 is shown in FIG. 2. From this view, the top side is clearly shown. On the top side are provided the AC input 24 for connection with and providing power to a computer monitor, a line power override switch 26 and an AC power switch 28. The line power override switch 26 disconnects the cable input 18 from the cable output 38, the XDSL input 20 from the xDSL output 40 and the modem input 22 from the modem output 42. The AC power switch is movable between an on position supplying power to the monitor and an off position disconnecting the supply of power to the monitor. The indicator light 30 provides a visual signal indicating the mode of operation of the personal computer failsafe protection device 10. On the first side 14 are provided the cable input connector 18, xDSL input connector 20 and modem line connector 22. On the second side 36 are the cable output connector 38, xDSL output connector 40, a modem line connector 42 and the telephone/fax connection 44 for connection with an external phone or fax machine. The AC power cord is shown extending from one side 32 for supplying power to the personal computer protection device 10 and all components connected thereto.

Figure 3:
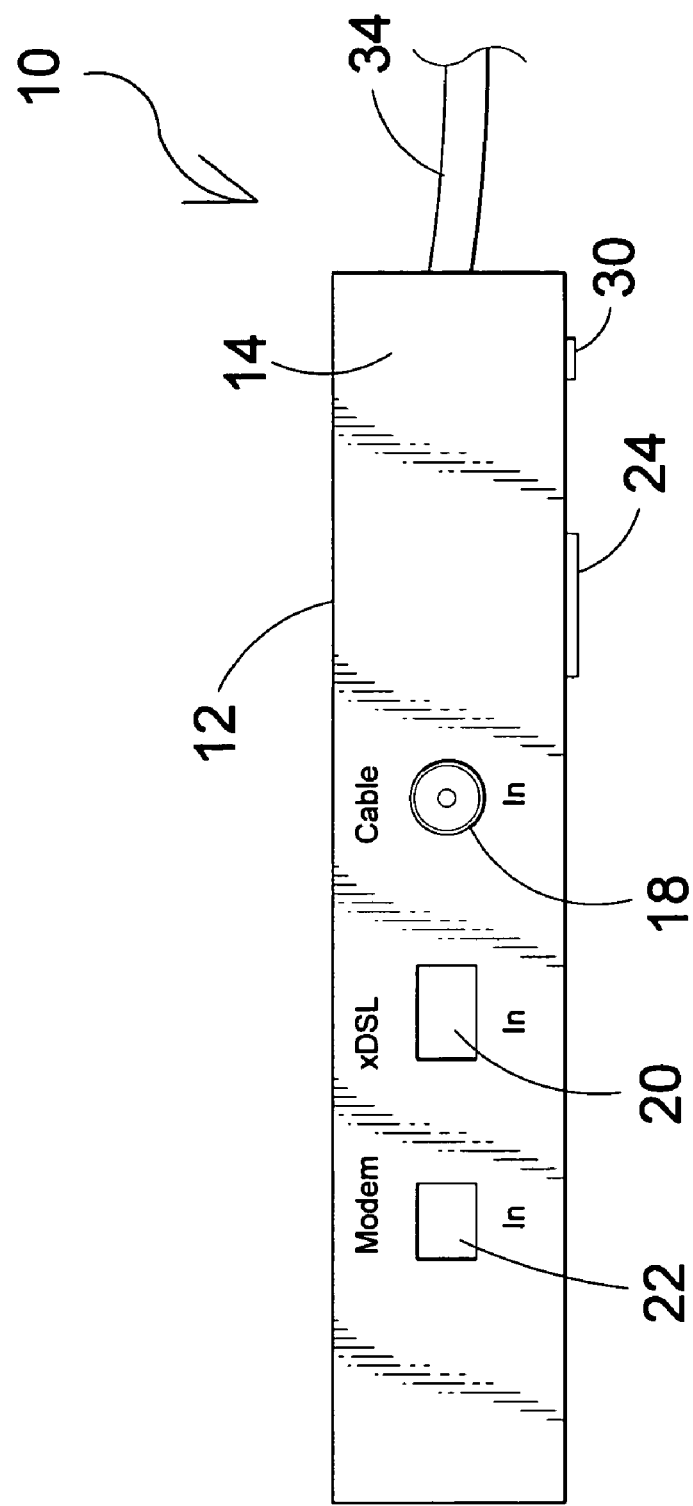
FIG. 3 is a top view of the personal computer protection device of the present invention.

The first side 14 of the housing 12 of the personal computer protection device 10 is shown in FIG. 3. This view shows the cable input connector 18, xDSL input connector 20 and modem line connector 22. On the top side 16, the AC input 24 for connection to the monitor and the indicator light 30 are shown extending therefrom. The AC power cord 34 is shown extending from the side of the housing 12.

Figure 4:
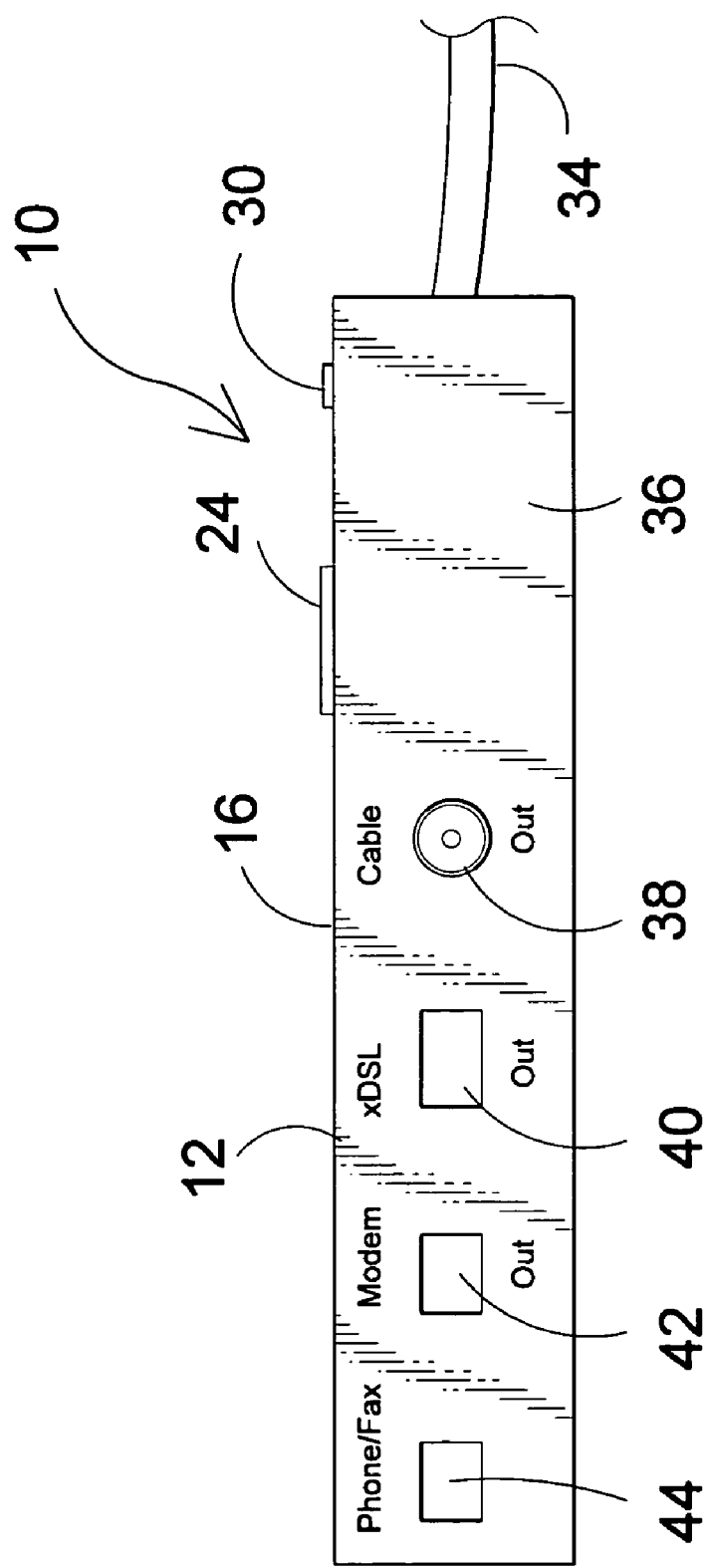
FIG. 4 is a bottom view of the personal computer protection device of the present invention.

The second side 36 of the housing 12 of the personal computer protection device 10 is shown in FIG. 4. This view shows the cable output connector 38, xDSL output connector 40, modem line output connector 42 and the telephone/fax connector 44. On the top side 16, the AC input 24 for connection to the monitor and the indicator light 30 are shown extending therefrom.

The AC power cord 34 is shown extending from the side of the housing 12.

Figure 5:
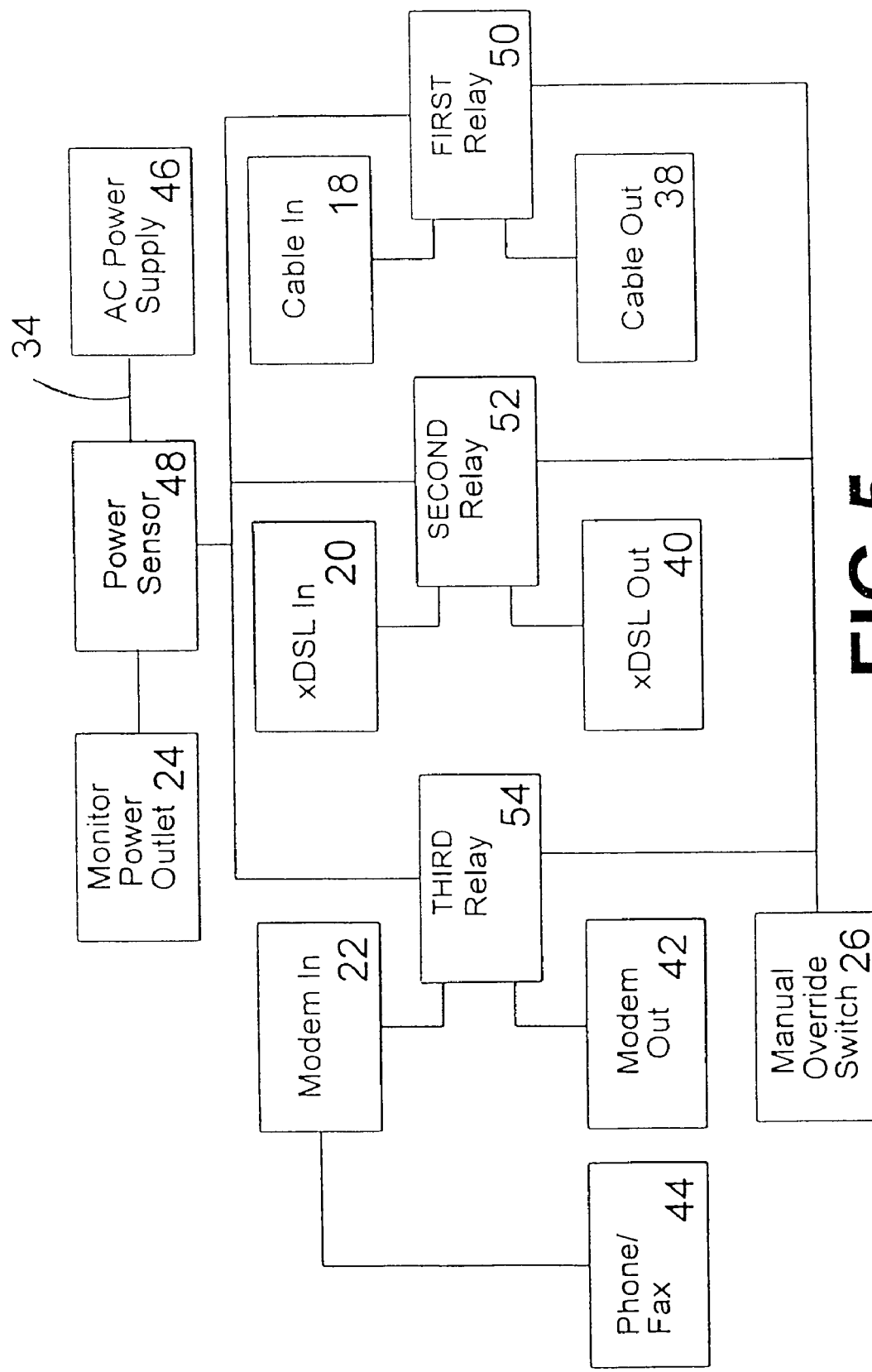
FIG. 5 is a block diagram illustrating the elements forming the personal computer protection device of the present invention for sensing the power drawn by a monitor.

A block diagram of the personal computer protection device 10 used to sense the power usage of a monitor is shown in FIG. 5. As can be seen from this figure, The AC input for the monitor is connected to a power supply 46 via a power sensor 48. The power sensor 48 senses the amount of power being drawn by a monitor connected to receive power from the AC power supply 46. The power sensor 48 is connected to a first relay 50, a second relay 52 and a third relay 54. The first relay 50 is connected between the cable input connector 18 and the cable output connector 38. The second relay 52 is connected between the xDSL input 20 and the xDSL output 40. The third relay is connected between the modem input port 22 and the modem output port 42. The manual override switch 26 is also coupled to the first, second and third relays 50, 52 and 54, respectively. The first relay 50 is triggered by the power sensor 48 to disconnect the cable input connector 18 and the cable output connector 38 upon sensing the monitor is drawing power below a predetermined threshold power. The second relay 52 is triggered by the power sensor 48 to disconnect the xDSL input 20 and the xDSL output 40 upon sensing the monitor is drawing power below a predetermined threshold power. The third relay 54 is triggered by the power sensor 48 to disconnect the modem input port 22 and the modem output port 42 upon sensing the monitor is drawing power below a predetermined threshold power. The manual override switch 26 causes the first, second and third relays 50, 52 and 54, respectively, to be triggered upon activation to disconnect the input ports from the output ports. The telephone/fax port 44 is connected to the telephone line via the modem input port 22 and is operational at all times. The operation of the telephone/fax port is not controlled by triggering of the third relay switch 54.

Figure 6:
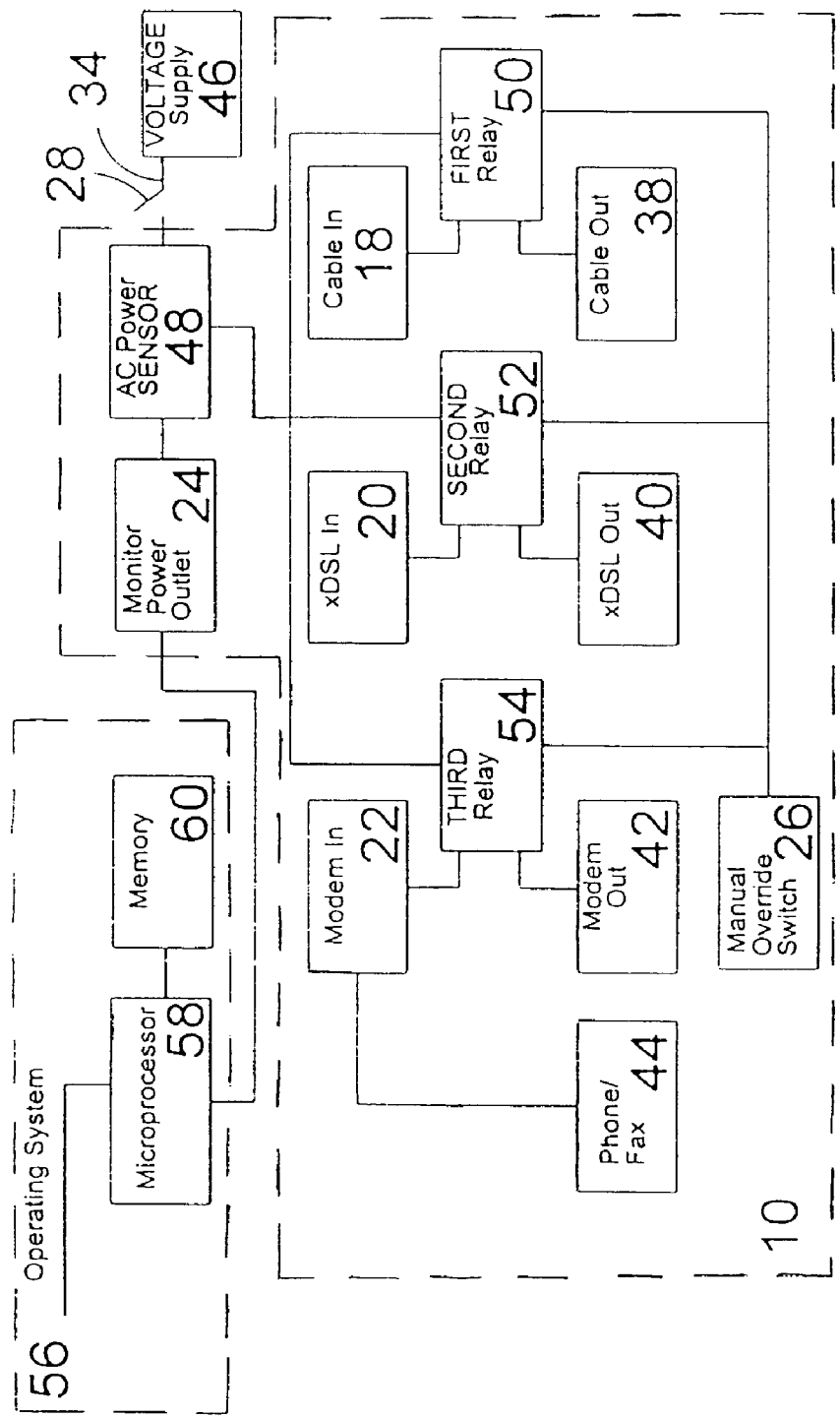
FIG. 6 is a block diagram showing the elements of the personal computer protection device of the present invention for connection to a one piece computer system including processor and monitor in a single unit.

A block diagram of the personal computer protection device 10 used to monitor the power drawn by a one piece computer system 56 is illustrated in FIG. 6. As can be seen from this figure, the AC power supply 46 is connected to supply power to the personal computer failsafe protection device 10 through the power cable 34. The power sensor 48 is connected between the power cable 34 and the AC power outlet 24. A processor 58 of the one piece computer system 56 is connected to receive power through the AC power outlet 24. The microprocessor 58 is connected to a memory 60 and to the other operational elements of the one piece computer system 56. The power sensor 48 senses the amount of power being drawn by the one piece computer system 56. The power sensor 48 is connected to the first relay 50, second relay 52 and third relay 54. The first relay 50 is connected between the cable input connector 18 and the cable output connector 38. The second relay 52 is connected between the xDSL input 20 and the xDSL output 40. The third relay 54 is connected between the modem input port 22 and the modem output port 42. The manual override switch 26 is also coupled to the first, second and third relays 50, 52 and 54, respectively. The first relay 50 is triggered by the power sensor 48 to disconnect the cable input connector 18 and the cable output connector 38 upon sensing the one piece computer system 56 is drawing power below a predetermined threshold power. The second relay 52 is triggered by the power sensor 48 to disconnect the xDSL input 20 and the xDSL output 40 upon sensing the one piece computer system 56 is drawing power below a predetermined threshold power. The third relay 54 is triggered by the power sensor 48 to disconnect the modem input port 22 and the modem output port 42 upon sensing the one piece computer system 56 is drawing power below a predetermined threshold power. The manual override switch 26 causes the first, second and third relays 50, 52 and 54, respectively, to be triggered upon activation to disconnect the input ports from the output ports. The telephone/fax port 44 is connected to the telephone line via the modem input port 22 and is operational at all times. The operation of the telephone/fax port is not controlled by triggering of the third relay switch 54.

The operation of the personal computer protection device 10 will now be described with reference to the figures. In operation, the personal computer protection device 10 is connected to a monitor of a computer system or to a one piece computer system 56 for measuring the amount of power being drawn thereby. The personal computer protection device 10 receives the power cord from either the monitor or the one piece computer system 56 at the AC power outlet 24. Any desired communication channel, cable, xDSL, modem, etc. is then connected to its respective input port in the personal computer protection device 10. A cable is then connected to the output port corresponding to the desired form of communications channel to be used. The other end of the cable is connected to the corresponding communications port of the computer system or one piece computer system 56. The power cord 34 is then connected to a power supply 46 and the personal computer protection device 10 is ready for operation.

In operation, the power switch 28 is turned to the on position placing the personal computer protection device 10 in an operating mode. The computer system and monitor or one piece computer system 56 are also placed in an on mode. The power sensor 48 continually senses the power being supplied to the monitor or one piece computer system 56 to determine when the power being drawn by the computer system and monitor or one piece computer system 56 is less than a predetermined value.

When the monitor remains inactive for a predetermined period of time, the monitor will enter a sleep mode. In the sleep mode, the power required to power the monitor decreases to a minimal amount thus saving energy when the monitor is not in use. Furthermore, when the power to the monitor or one piece computer system 56 is turned off, the voltage used thereby is minimal. During each of these instances, the lines of communication, e.g. cable line, xDSL line and modem lines, are still powered up due to power present on the communications channel. At this time, a hacker is able to break into the computer system through these communications channels due to the power present on the communications channel. In order to prevent the possibility of hackers breaking into the computer system when the monitor or computer are powered down or in an idle/sleep state, the input ports to the computer system must be isolated from the system.

When the power sensor 48 senses the power drawn by the monitor or one piece computer system 56 has dropped below a threshold level such as during a sleep state or power down of the system, the power sensor will activate the first, second and third relays 50, 52 and 54, respectively, to be triggered. Triggering of the first relay causes the cable input connector 18 to be disconnected from the cable output connector 38 thereby isolating the computer system from the cable line. Triggering of the second relay 52 causes the xDSL input connector 20 to be disconnected from the xDSL output connector 40 thereby isolating the computer system from the xDSL line. Triggering of the third relay 54 causes the modem input port 22 to be disconnected from the modem output port 42 thereby isolating the computer system from the modem line. The telephone/fax line 44 will remain connected to the telephone line at all times.

Alternatively, the user is able to manually disconnect the computer system from the communications channels by activating the manual override switch 26. The manual override switch 26 is connected to the first, second and third relays and triggers each upon activation. Upon triggering by the manual override switch 26, the first relay causes the cable input connector 18 to be disconnected from the cable output connector 38 thereby isolating the computer system from the cable line, the second relay 52 causes the xDSL input connector 20 to be disconnected from the xDSL output connector 40 thereby isolating the computer system from the xDSL line and the third relay 54 causes the modem input port 22 to be disconnected from the modem output port 42 thereby isolating the computer system from the modem line.

When the power sensor 48 senses that the power being drawn by the monitor or the one piece computer system 56 moves above the threshold level, the first, second and third relays 50, 52 and 54, respectively, are triggered again. When triggered, the first relay will reconnect the cable input connector 18 and the cable output connector 38 thereby reconnecting the computer system and the cable line, the second relay 52 causes the xDSL input connector 20 to be reconnected to the xDSL output connector 40 thereby reconnecting the computer system and the xDSL line and the third relay 54 causes the modem input port 22 to be reconnected to the modem output port 42 thereby reconnecting the computer system and the modem line.

The power sensor 48 is able to trigger the first, second and third relays 50, 52 and 54, respectively, to connect the cable, xDSL and/or modem lines to the computer system or one piece processor monitor system during a predetermined time period during the day to allow a user access to the computer system or one piece processor monitor system. Thus, a user is able to connect with his computer system at a predetermined time which is unknown to others to retrieve data stored in the computer system. Upon expiration of the time period, the power sensor 48 retriggers the first, second and third relays 50, 52 and 54, respectively, to disconnect the cable, xDSL and/or modem lines from the computer system or one piece processor monitor system.

From the above description it can be seen that the personal computer protection device of the present invention is able to overcome the shortcomings of prior art devices by providing a personal computer protection device which is able to disconnect a personal computer or a one piece processor monitor system from cable, DSL and regular modem/phone lines when the computer has been turned off by sensing the voltage at a monitor to determine if the monitor has entered a sleep mode or has been turned off and disconnecting the personal computer from the cable, DSL and regular modem/phone lines upon detecting the monitor has entered a sleep mode or has been turned off. The personal computer protection device includes input and output ports for cable, DSL and regular modem/phone lines and an additional output port for connection to a telephone or facsimile machine which is operable even when the ports for the cable, DSL and regular modem/phone lines have been disconnected by the device. The personal computer device allows access to the computer for a specific preset period during the day thereby allowing the user to connect with the computer during the predetermined interval. Furthermore, the personal computer protection device of the present invention is simple and easy to use and economical in cost to manufacture.

It will be understood that each of the elements described above, or two or more together may also find a useful application in other types of methods differing from the type described above.

While certain novel features of this invention have been shown and described and are pointed out in the annexed claims, it is not intended to be limited to the details above, since it will be understood that various omissions, modifications, substitutions and changes in the forms and details of the device illustrated and in its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is new and desired to be protected by Letters Patent is set forth in the appended claims:

1. A personal computer protection device for disconnecting a computer system from a network connection during power down periods, said personal computer protection device comprising:
    an AC outlet for providing electrical power to a monitor of the computer system;
    means for sensing an amount of power drawn from said AC outlet by said monitor;
    a housing having an input port for connecting to a network;
    an output in said housing for connecting said input port to a network connection of the computer system; and
    a relay in said housing connected between said input port and output port for selectively disconnecting said input port and output port automatically upon said sensing means sensing the power drawn from said AC outlet is below a threshold value indicating the computer system is in a powered down or sleep state.

2. The personal computer protection device as recited in claim 1, wherein said input and output ports are cable connectors, said input port being connectable to a cable line.

3. The personal computer protection device as recited in claim 1, wherein said input and output ports are xDSL, said input port being connectable to a xDSL line.

4. The personal computer protection device as recited in claim 1, wherein said input and output ports are telephone connectors, said input port being connectable to a telephone line.

5. The personal computer protection device as recited in claim 1, wherein said device includes first, second and third input ports, first, second and third corresponding output ports and first second and third relays, each relay being connected between a respective pair of input and output ports.

6. The personal computer protection device as recited in claim 5, wherein said first input and first output ports are cable connectors, said second input and second output ports are xDSL connectors and said third input and third output ports are telephone connectors.

7. The personal computer protection device as recited in claim 6, further comprising a telephone/facsimile connector, said telephone/facsimile connector being powered on at all times said device is in the on mode.

8. The personal computer protection device as recited in claim 5, further comprising a manual override switch for manually triggering said relay to disconnect said first, second and third input ports from said first, second and third output ports, respectively.

9. The personal computer protection device as recited in claim 6, further comprising a manual override switch for manually triggering said relay to disconnect said input and output ports, thereby switching the protection device from an on mode to an off mode, and an AC power switch for turning off all power to said protection device and computer.

10. The personal computer protection device as recited in claim 1, wherein said means for sensing triggers said relay to connect said input and output port during a predetermined period during a day thereby allowing a user to contact the computer system through the communications channel during the predetermined time of day.

11. The personal computer protection device as recited in claim 1, wherein said sensing means senses the amount of power used by the computer system including the monitor.

12. The personal computer protection device as recited in claim 1, wherein said sensing means senses the amount of power drawn directly from the AC outlet by the monitor.

13. A personal computer protection device for disconnecting a computer system from a network connection during power down periods, said personal computer protection device including:
a housing having input and output ports for various types of network connections, with one input port being connected through a line to one output port for each particular type of network connection;
a plug connectable to an AC power source;
an AC outlet for providing electrical power;
means for sensing a power drawn from said AC outlet by a monitor in said computer system;
a relay in said housing in each line connecting an input port to an output port;
said sensing means disabling each relay for disconnecting the input ports from the output ports when the power drawn by the monitor from said AC outlet is below a threshold value indicating the computer system is in a powered down or sleep state; and
a manually operated switch for disabling said relays to move said protection device from an on mode to an off mode.

14. A personal computer protection device for disconnecting a computer system from a network connection during reduced power periods, said personal computer protection device comprising:
an AC power outlet;
a power sensor monitoring power drawn by a monitor of the computer system from said AC power outlet;
a housing having an input port for connecting to a network;
an output in said housing for connecting said input port to a network connector of the computer system; and
a relay in said housing connected between said input port and output port for selectively disconnecting said input port and output port automatically upon said power sensor detecting that the power drawn is below a threshold value indicating the computer system is in a reduced power state.

15. The personal computer protection device of claim 14, wherein said power sensor monitors power consumption by monitoring a voltage.

16. The personal computer protection device of claim 14, wherein said power sensor monitors power drawn by said monitor by monitoring the power drawn by said computer system including said monitor.

* * * * *